US012636954B2

(12) United States Patent
Diamond et al.

(10) Patent No.: US 12,636,954 B2
(45) Date of Patent: May 26, 2026

(54) VEHICLE HUD WITH EXTERNAL SCREEN PROJECTION

(71) Applicant: Ford Global Technologies, LLC, Dearborn, MI (US)

(72) Inventors: Brendan Francis Diamond, Grosse Pointe, MI (US); John Robert Van Wiemeersch, Novi, MI (US); Ryan Joseph Gorski, Grosse Pointe Farms, MI (US); Haibo Zhao, Northville, MI (US); Janice Lisa Tardiff, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 437 days.

(21) Appl. No.: 18/325,346

(22) Filed: May 30, 2023

(65) Prior Publication Data

US 2024/0399860 A1     Dec. 5, 2024

(51) Int. Cl.
B60K 35/80 (2024.01)
B60K 35/28 (2024.01)
(Continued)

(52) U.S. Cl.
CPC .............. B60K 35/80 (2024.01); B60K 35/28 (2024.01); G02B 5/32 (2013.01); B60K 35/23 (2024.01); B60K 35/60 (2024.01); B60K 35/81 (2024.01); B60K 2360/334 (2024.01); B60K 2360/573 (2024.01); B60K 2360/785 (2024.01)

(58) Field of Classification Search
CPC ........ B60K 35/80; B60K 35/28; B60K 35/23;

B60K 35/60; B60K 35/81; B60K 2360/334; B60K 2360/573; B60K 2360/785; B60K 2360/177; B60K 2360/179; B60K 35/00; B60K 35/231; G02B 5/32; G02B 27/0103

See application file for complete search history.

(56) References Cited

U.S. PATENT DOCUMENTS

| 2010/0321170 A1* | 12/2010 | Cooper .................. G02B 27/01 |
| | | 345/9 |
| 2014/0333510 A1* | 11/2014 | Wischmeyer .......... B64D 43/00 |
| | | 345/8 |

(Continued)

FOREIGN PATENT DOCUMENTS

| CN | 204406693 U | 6/2015 |
| CN | 114299750 A | 4/2022 |

(Continued)

OTHER PUBLICATIONS

Bhardwaj. U., "Follow Me Home Headlights And Why It's Not A Gimmick," https://gomechanic.in, Mar. 24, 2021, 3 pages.

*Primary Examiner* — Richard M Camby
(74) *Attorney, Agent, or Firm* — Frank Lollo; Brooks Kushman P.C.

(57) ABSTRACT

A computing device, e.g., in a vehicle, can receive a communication trigger for a heads-up display (HUD) in a vehicle to project light external to a vehicle. The device can then identify a projection parameter to visibly project the light external to the vehicle, e.g., beyond a viewing area on a projection screen in or on the vehicle, and can then cause the HUD to project the light from the HUD to be visible external to the vehicle in response to the communication trigger.

21 Claims, 9 Drawing Sheets

(51) Int. Cl.

| | | |
|---|---|---|
| *G02B 5/32* | (2006.01) | |
| *B60K 35/23* | (2024.01) | |
| *B60K 35/60* | (2024.01) | |
| *B60K 35/81* | (2024.01) | |

(56) References Cited

U.S. PATENT DOCUMENTS

| | | | | |
|---|---|---|---|---|
| 2019/0155028 A1* | 5/2019 | Svarichevsky | ........ | G02B 27/18 |
| 2019/0162959 A1* | 5/2019 | Lee | .......................... | G02B 5/09 |
| 2021/0026134 A1* | 1/2021 | Harkins | ............. | G02B 27/0101 |
| 2023/0161159 A1* | 5/2023 | Belkin | ............... | G02B 27/0025 |
| | | | | 359/630 |

FOREIGN PATENT DOCUMENTS

| | | | |
|---|---|---|---|
| JP | 11157387 A | 6/1999 | |
| JP | 2015098677 A | 5/2015 | |
| KR | 20140123876 A | 10/2014 | |

* cited by examiner 156
158
158
152
158
158
154

122

122
168
170
α
174
β
166
172
126A
124A

VEHICLE HUD WITH EXTERNAL SCREEN PROJECTION

BACKGROUND

A vehicle may be equipped with a heads-up display ("HUD"). A transparent display type of HUD includes a projector that projects an image onto a holographic optical element ("HOE") of a laminated windshield. The laminated windshield has a holographic film layer disposed between glass layers. The holographic film layer defines the HOE. Typically a HUD may be provided so that an occupant of the vehicle may view the image projected by the HUD onto the laminated windshield.

DESCRIPTION

Introduction

Figure 1:
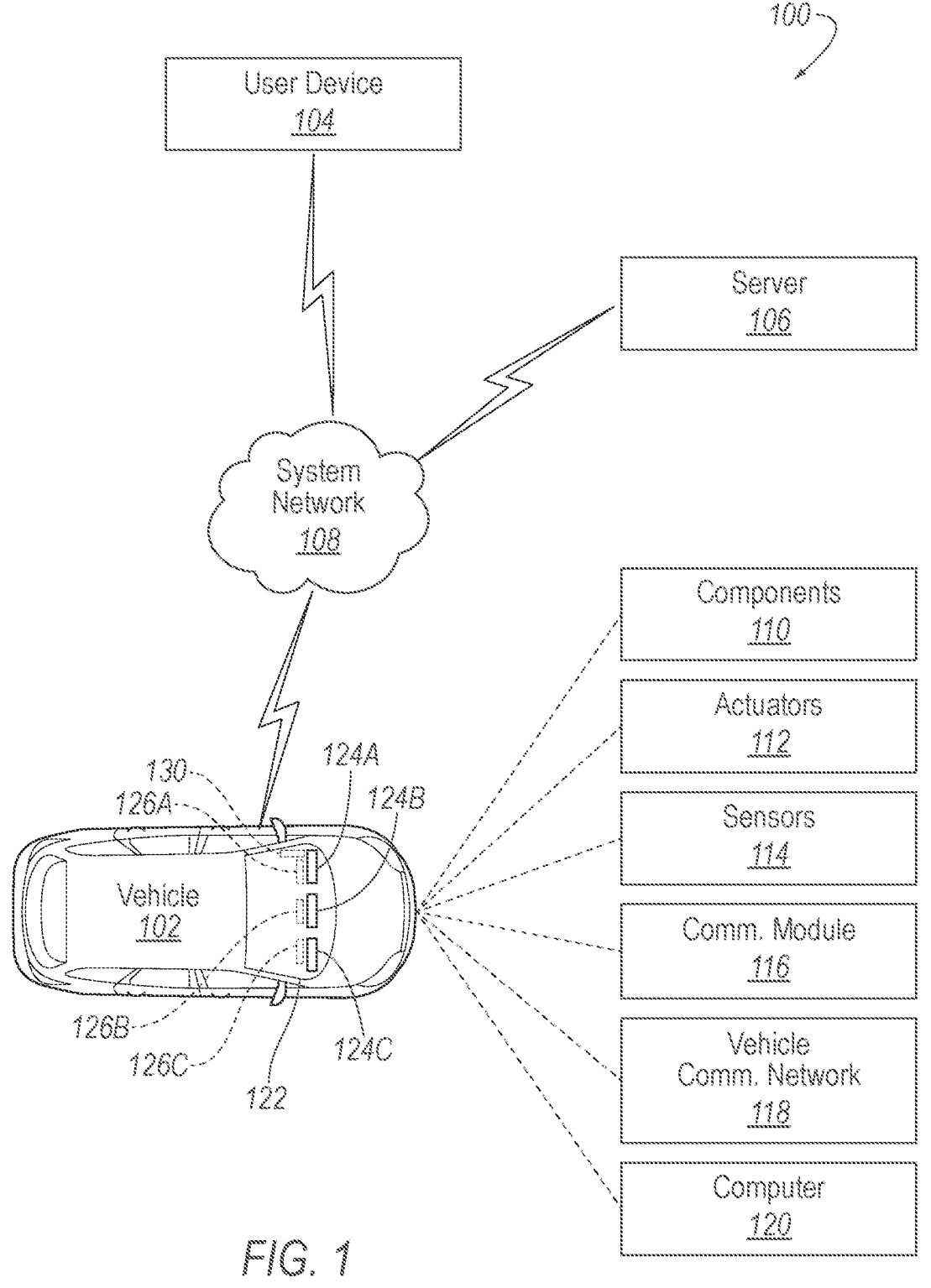
FIG. 1 is a block diagram illustrating an example image projection control system for a vehicle.

As described herein, a vehicle can include a heads-up display (HUD) system. One or more projectors included in the HUD system may be controlled by a vehicle computing device. Based on some communication trigger, e.g., a communication from a mobile device external to the vehicle, detection of a moving object external to the vehicle, etc., the vehicle computing device may project light external to the vehicle. The light may be projected based on a projection parameter, e.g., specifying a medium external to the vehicle, and/or an intensity, a timing, a pattern, etc. of the light, external to the vehicle. Thus, the HUD may advantageously be utilized to display information to users external to the vehicle.

A method in accord with this disclosure may include receiving a communication trigger for a heads-up display (HUD) in a vehicle to project light external to a vehicle; identifying a projection parameter to visibly project the light external to the vehicle; and projecting the light from the HUD to be visible external to the vehicle in response to the communication trigger.

The method can be implemented in a system comprising a computing device that includes a processor and a memory, wherein the memory stores instructions executable by the processor such that the computing device is configured to receive a communication trigger for a heads-up display (HUD) in a vehicle to project light external to a vehicle; identify a projection parameter to visibly project the light external to the vehicle; and project the light from the HUD to be visible external to the vehicle in response to the communication trigger.

The projection parameter can be based on a detected medium external to the vehicle. The detected medium can include at least one of a surface of an object or moisture in an environment proximate to the vehicle. An intensity of the light can be modified to enhance visibility of the light based a characteristic of the detected medium. The light can be projected to form an image, which may include at least one of an indicia of a location of the vehicle or an identity of the vehicle.

Project the light may include adjusting an angle of projection of the light, which may include determining the angle of projection based on a detected medium external to the vehicle, and/or adjusting the angle of projection at multiple times while projecting the light.

The light may be projected, in addition to in response to the communication trigger, based on one or both of a location of the vehicle and an environment around the vehicle. The communication trigger may include a request from a user device to locate the vehicle, a request from a second vehicle, and/or a detected object within a specified distance of the vehicle.

The system may include a second heads-up display (HUD), from which second light may be projected in response to the communication trigger. The second light may form a second image. The second light may form a pattern with the light projected from the HUD.

The light may be projected in concert with other light projected from one or more non-heads-up display light sources.

The light may be projected according to a pattern that encodes a message, wherein the pattern specifies one or more of a color, a shape, and a timing of projecting the light. The pattern may specify the timing. The timing may be based on a temperature.

The projection parameter may be based on energy usage.

With reference to FIGS. 1-10, a system for providing light, which may provide an image from a HUD projector projecting beyond a window is set forth below is described. While a windshield is an example window illustrated in and described with respect to the Figures, the disclosure is applicable to any vehicle window.

Vehicle Overview (Including HUD System)

With reference to FIG. 1, an example vehicle system 100 can include the following example elements: a vehicle 102, a user device 104, a server 106, and a system network 108.

The vehicle 102 includes a plurality of vehicle components 110, a plurality of vehicle actuators 112, a plurality of vehicle sensors 114, a vehicle communication module 116, a vehicle communications network 118, and a vehicle computer 120.

In the context of the present disclosure, a vehicle component 110 is one or more hardware components adapted to perform a mechanical or electro-mechanical function or operation-such as moving the vehicle 102, slowing or stopping the vehicle 102, steering the vehicle 102, displaying information, etc. Non-limiting examples of components 110 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, a door lock component, headlights, dashboard instrumentation, an in-vehicle dashboard display screen, a window 122, an example window being a windshield 122, incorporating a holographic film layer having one or more holographic optical elements formed thereon to define one or more corresponding substantially transparent HUD screens such as screens 124A, 124B, 124C which may receive light from one or more respective digital light processing (DLP) HUD projectors 126A, 126B, 126C, a virtual HUD projector 130, etc.

The vehicle actuators 112 are implemented via circuits, chips, or other electronic and/or mechanical components that can actuate various vehicle subsystems in accordance with appropriate control signals as is known. The actuators 112 may be used to control the components 110, including brake components for braking, propulsion components for acceleration, steering components for steering of a vehicle 102, and door lock components for locking vehicle doors.

Vehicle sensors 114 may include a variety of devices such as are known to provide data to the vehicle computer 120. For example, the sensors 114 may include Light Detection And Ranging (LIDAR) sensors 114 that provide relative locations, sizes, and shapes of objects, including people, surrounding the vehicle 102. As another example, one or more radar sensors 114 may provide data to provide locations of the objects, second vehicles, etc., relative to the location of the vehicle 102. The sensors 114 may further alternatively or additionally, for example, include cameras 114, e.g., front view, side view, 360° view, etc., providing images from an area surrounding the vehicle 102. As another example, the vehicle 102 may include one or more sensors 114, e.g., cameras 114, mounted inside a cabin of the vehicle 102 and oriented to capture images of users, including a vehicle operator, i.e., a driver, in the vehicle 102 cabin. In the context of this disclosure, an object is a physical, i.e., material, item that has mass and that can be represented by physical phenomena (e.g., light or other electromagnetic waves, or sound, etc.) detectable by sensors 114. Other sensors 114 may include seat pressure sensors 114 able to sense the presence of a weight on a seat, and ambient light sensors 114 capable of determining a magnitude of ambient light outside of the vehicle. Thus, the vehicle 102, and people, as well as other items including as discussed below, fall within the definition of "object" herein. Additional example sensors 114 may also include steering sensors, drive motor sensors, brake sensor, wheel speed sensors, and battery sensors.

The vehicle communication module 116 allows the vehicle computer 120 to communicate with a remote computer (not shown) of the server 106, and/or the user device 104, by way of example, a messaging or broadcast protocol such as Dedicated Short Range Communications (DSRC), Cellular Vehicle-to-Everything (C-V2X), Bluetooth® Low Energy (BLE), Ultra-Wideband (UWB), Wi-Fi®, cellular, and/or other protocol that can support vehicle-to-vehicle, vehicle-to-structure, vehicle-to-cloud communications, or the like, and/or via the system network 108.

The vehicle computer 120 is a computing device that includes a processor and a memory such as are known. The memory includes one or more forms of computer-readable media, and stores instructions executable by the vehicle computer 120 for performing various operations, including as disclosed herein. The vehicle computer 120 can further include two or more computing devices operating in concert to carry out vehicle 102 operations including as described herein. Further, the vehicle computer 120 can be a generic computer with a processor and memory as described above and/or may include a dedicated electronic circuit including an ASIC (application-specific integrated circuit) that is manufactured for a particular operation, e.g., an ASIC for processing sensor 114 data and/or communicating the sensor 114 data. In another example, the vehicle computer 120 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 120.

The vehicle computer 120 may include or be communicatively coupled, an example coupling provided by the vehicle communication network 118 such as a communications bus as described further below, to more than one processor, e.g., included in electronic controller units (ECUs) or the like included in the vehicle 102 for monitoring and/or controlling various vehicle components 110, e.g., a transmission controller, a brake controller, a steering controller, etc. The vehicle computer 120 is generally arranged for communications on the vehicle communication network 118 that can include a communication bus in the vehicle 102 such as a controller area network (CAN) or the like, and/or other wired and/or wireless mechanisms including Wi-Fi® and Bluetooth.

Via the vehicle communication network 118, the vehicle computer 120 may transmit messages to various devices in the vehicle 102 and/or receive messages (e.g., CAN messages) from the various devices, e.g., sensors 114, actuators 112, ECUs, etc. Alternatively, or additionally, in cases where the vehicle computer 120 comprises a plurality of computing devices that may be associated with particular components and systems of the vehicle 102, the vehicle communication network 118 may be used for communications between the computing devices which may be represented as the vehicle computer 120 in this disclosure. Further, as mentioned below, various controllers and/or sensors 114 may provide data to the vehicle computer 120 via the vehicle communication network 118.

The vehicle computer 120 is programmed to receive data from one or more sensors 114, e.g., substantially continuously, periodically, and/or when instructed by the remote computer of the server 106, etc. The data may, for example, include a location of the vehicle 102. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 102, a sign, a tree, a person, etc., relative to the vehicle 102. As one example, the data may be image data of the environment around the vehicle 102. In such an example, the image data may include one or more objects and/or markings, e.g., lane markings, on or along a road. Image data herein means digital image data, i.e., comprising pixels, typically with intensity and color values, that can be acquired by cameras 114. The sensors 114 can be mounted to any suitable location in or on the vehicle 102, e.g., on a vehicle 102 bumper, on a vehicle 102 top, etc., to collect images of the environment around the vehicle 102.

In addition, the vehicle computer 120 may be configured for communicating via the vehicle communication module 116 and the system network 108 with devices outside of the vehicle 102, e.g., with the user device 104 and the server 106, using wireless communications (cellular and/or C-V2X, etc.) or direct radio frequency communications. The communication module 116 could include one or more mechanisms, such as a transceiver, to facilitate such communication, and may employ any desired combination of wireless (e.g., cellular, wireless, satellite, microwave, audio, ultrasonic, and radio frequency) communication mechanisms and any desired network topology (or topologies when a plurality of communication mechanisms are utilized). Exemplary communications provided via the communication module 116 include cellular, Bluetooth®, IEEE 802.11, Ultra-Wideband (UWB), Near Field Communication (NFC), dedicated short range communications (DSRC), Cellular Vehicle-to-Everything (C-V2X), and/or wide area networks (WAN), including the Internet, providing data communication services.

The remote server 106 can be a conventional computing device, i.e., including one or more processors and one or more memories, programmed to provide operations such as disclosed herein. Further, the remote server 106 can be accessed via the network 108, e.g., the Internet, a cellular network, and/or or some other wide area network, particular forms of which may be characterized as a cloud server 106.

The system network 108 represents one or more mechanisms by which a vehicle computer 120 may communicate with remote computing devices, e.g., the remote computer of the server 106, another vehicle computer, etc. Accordingly, the network 108 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), UWB, NFC, IEEE 802.11 including Wi-Fi, vehicle-to-vehicle (V2V) such as Dedicated Short Range Communications (DSRC), etc.), local area networks (LAN) and/or wide area networks (WAN), including the Internet, providing data communication services).

An example user device 104 may be provided by a smartphone 104 or a purpose-specific wireless communication device incorporating a suitable vehicle control software application (e.g., what may sometimes be referred to as a key fob). The user device 104, like other elements of the vehicle image projection control system 100, may include hardware suited to connecting to wireless communication networks (e.g., using Bluetooth®, Bluetooth® Low Energy (BLE), UWB, NFC, IEEE 802.11 including Wi-Fi, vehicle-to-vehicle (V2V) such as Dedicated Short Range Communications (DSRC), C-V2X, etc.), local area networks (LAN) and/or wide area networks (WAN), including the Internet, providing data communication services).

Image Projection System

Figure 2:
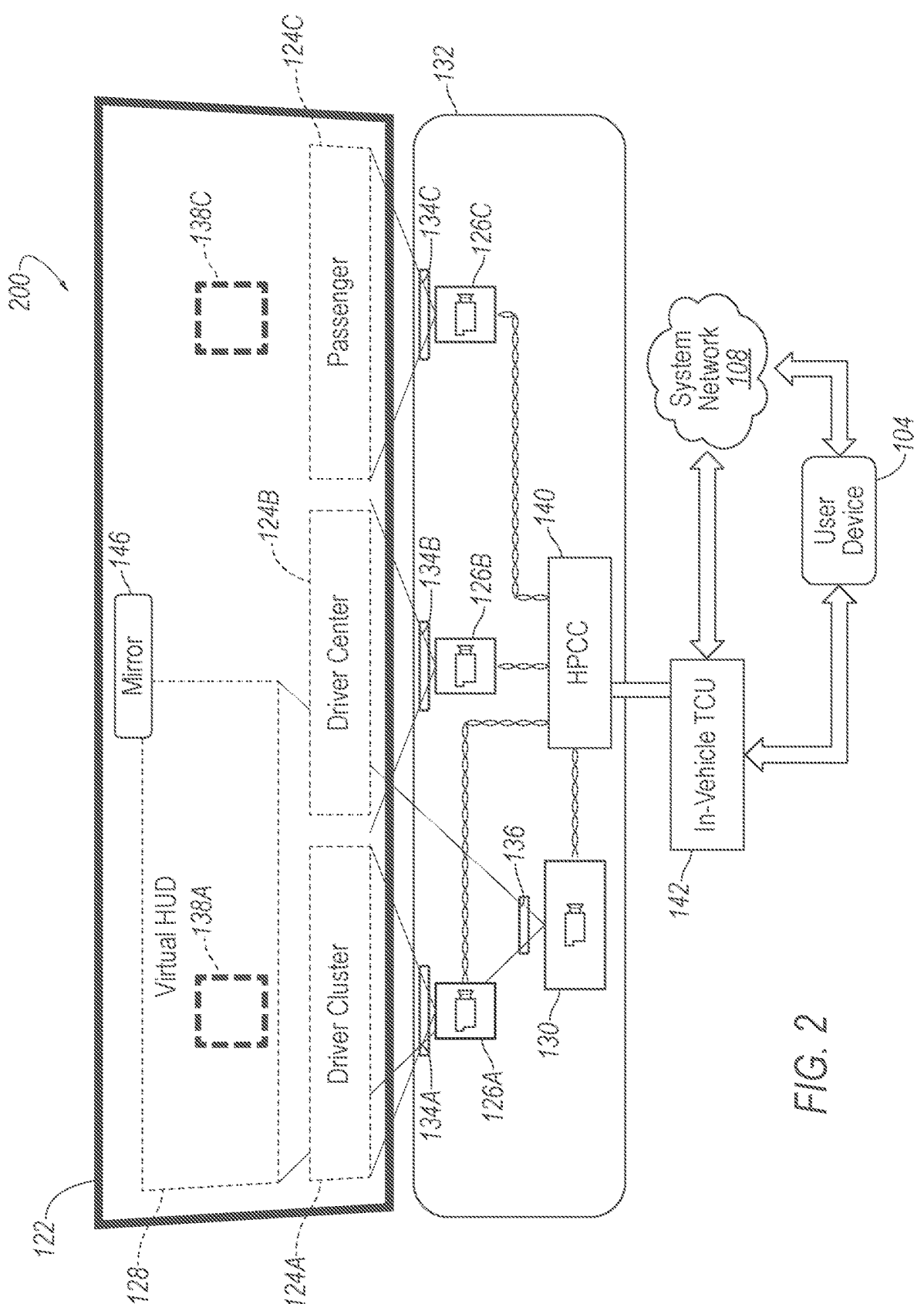
FIG. 2 is a more detailed block diagram of the example image projection control system of FIG. 1.

The vehicle image projection system 200 as illustrated in FIG. 2 includes the example window 122, i.e., the windshield 122, that includes the substantially transparent HUD screens 124A, 124B, and 124C.

The windshield 122 has a laminated structure, described below in the context of FIG. 3, which includes a holographic film layer 152. The holographic film layer 152 may be formed of a photopolymer film that may extend across the entire windshield 122 and include one or more discrete areas upon which holographic optical elements ("HOEs") are formed, e.g., etched. Each of the HUD screens 124A, 124B, and 124C are defined by a corresponding HOE of the holographic film layer 152. Based on the relative positioning of each of the screens 124A, 124B, and 124C, and given a left-drive vehicle in which a vehicle operator, i.e., a driver, is intended to be seated on a left side of the vehicle 102, the leftmost HUD screen 124A may be referenced to as a driver cluster screen 124A, the HUD screen 124B to the right of the screen 124A may be referenced to as the driver center screen 124B, and the right-most HUD screen 124C may be referenced to as the passenger screen 124C.

There may be separate transparent display digital light HUD projectors 126A, 126B, and 126C, alternatively referenced to as TD HUD projectors herein, associated with each of the HUD screens 124A, 124B, and 124C. Similar to the above-described approach to naming the HUD screens 124A, 124B, and 124C, the TD HUD projectors 126A, 126B, and 126C may be respectively referenced to as, from left to right, a driver cluster projector 126A, a driver center projector 126B, and a passenger projector 126C.

The vehicle operator's view of the windshield 122 may include a virtual HUD projection area 128 in which the operator, depending on a location of the operator's eyes, may be able to view information projected by the virtual HUD projector imager 130. The virtual HUD projection area 128 is a portion of the windshield 122 on which or beyond which an image provided by the virtual HUD projector 130 may be viewed by the operator.

Each of the projectors 126A, 126B, 126C, and 130 may be disposed beneath or behind a dashboard 132. The dashboard 132, from a perspective of a vehicle operator seating position, is disposed in a forward portion of an interior of the vehicle 102 and below the windshield 122. The dashboard 132 may extend a full width of the interior of the vehicle 102. The dashboard 132 may be alternatively referenced to as an instrument panel 132.

When the projectors 126A, 126B, 126C, and 130 are all disposed beneath or behind a dashboard, provision must be made for light to pass from the projectors 126A, 126B, 126C, and 130 to a viewing area for each. Such provision may be provided by apertures 134A, 134B, 134C, and 136 in the dashboard. The dashboard 132 of FIG. 2 is schematically illustrated as providing a driver cluster aperture 134A, a driver center aperture 134B, a passenger aperture 134C, and a virtual HUD aperture 136, each aperture 134A, 134B, 134C, and 136 respectively aligned with projectors 126A, 126B, 126C, and 130. In some applications, aperture 136 and aperture 134A may be combined into one larger aperture for projectors 126A and 130. Alternatively, apertures 134A and 134B may be combined into a single aperture. In yet another configuration, apertures 134A, 134B and 136 may all be combined into a single aperture.

The TD HUD projectors 126A, 126B, 126C are positioned and oriented to respectively project images onto the HUD screens 124A, 124B, and 124C. The virtual HUD projector 130 may project an image having the appearance of being beyond the windshield 122 viewable in the virtual HUD projection area 128 without a screen in the windshield 122. The images on the HUD screens 124A, 124B, and 124C that are projected by the TD HUD projectors 126A, 126B, and 126C are only viewable from predetermined positions within the vehicle. The predetermined positions are specific to each of the HUD screens 124A, 124B, and 124C. Likewise, the image projected by the virtual HUD projector 130 is only viewable from a predetermined position within the vehicle.

Each of the predetermined positions for viewing the images on the HUD screens 124A, 124B, and 124C and the image provided by the virtual HUD projector 130 may be defined by a viewing area 138A and 138C for each. The viewing area for each of the driver cluster screen 124A, the driver center screen 124B, and the image from the virtual HUD projector 130 may overlap and may be substantially the same as each other and aggregated in a first viewing area identified herein as a driver viewing area 138A. The viewing area for the passenger screen 124C is a second viewing area identified herein as a passenger viewing area 138C. While the viewing areas 138A and 138C are shown as being rectangular in FIG. 2, the viewing areas may be, by way of example, spherical or ovoid.

The example projectors 126A, 126B, 126C, and 130 may each be in electronic communication with the projector controller 140, which includes one or more computing devices, e.g., may be provided by a high performance computer cluster or the like. Such electronic communication may be effected wirelessly or by wire, as may be provided by the vehicle communication network 118. The projector controller 140 may provide image data to each of the projectors 126A, 126B, 126C, and 130. The projector controller 140 may comprise part of the computer 120.

The projector controller 140 may be in electronic communication, effected either by wire or wirelessly, with an in-vehicle telematics control unit 142 which may alternatively be referenced to as a TCU 142. The projector controller 140 may receive image data for each of the projectors from the TCU 142. The TCU 142 may comprise at least a part of the communication module 116.

The TCU 142 may also electrically communicate with, both sending data to and receiving data from, the user device 104. Data from the user device 104 may include entertainment content streamed from the internet which may be accessed in the form of cellular data available from public and subscription cellular data services. Data to the user device 104 may include commands made by a vehicle operator or a front seat passenger on an in-vehicle dashboard display screen 110, comprising one of the vehicle components 110, located, by way of example in the dashboard 132 or in a center console of the vehicle, below the dashboard 132. The in-vehicle display screen 110, when included, may also be in electronic communication with the TCU 142. The TCU 142 may be connected to the user device 104 wirelessly, via Wi-Fi or Bluetooth®, or by wire, as with a cable having appropriately compatible termination ends, such as, by way of example, a USB plug or a USB-C plug.

FIG. 2 includes a schematic representation of an example rear-view mirror 146 to aid in illustrating the relative positions of the screens 124A, 124B, 124C and the viewing areas 138A and 138C within the projection area 128.

Figure 3:
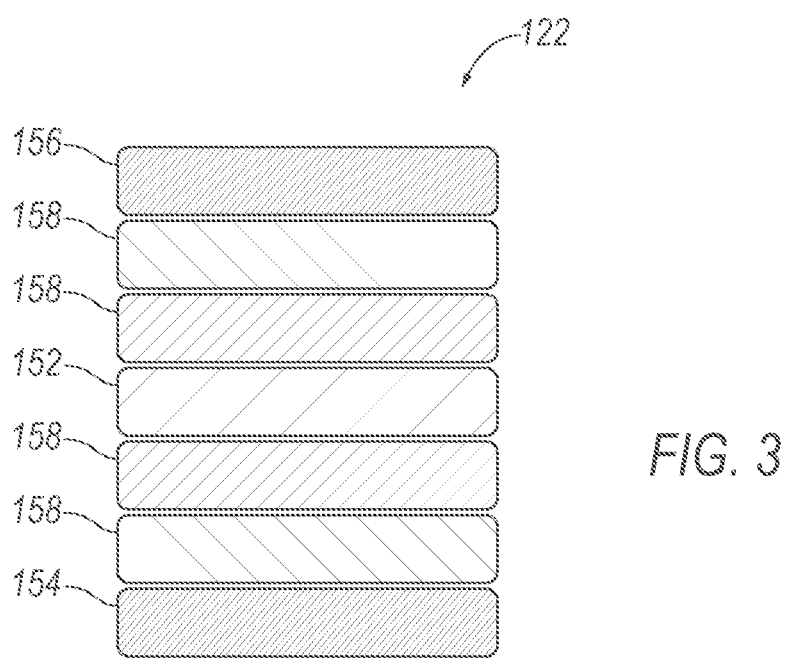
FIG. 3 is a schematic illustration of first example layers of a laminated windshield.

FIG. 3 is a schematic illustration of a first example of lamination layers of the windshield 122 in the regions of the windshield comprising the driver cluster screen 124A, the driver center screen 124B, and the passenger screen 124C. A key layer is the holographic film layer 152. The holographic film layer 152 has its HOEs configured uniquely and specifically for each of the screens 124A, 124B, and 124C to provide reflections of images projected onto each screen by the respective TD HUD projectors 126A, 126B and 126C only to the targeted viewing areas 138A and 138C. In the case of the screens 124A and 124B, the reflected images thereof can only be viewed at a design-intent clarity by a person sitting in a vehicle operator seat with at least one of their eyes disposed in an eye box from which the person can view the projection in the viewing area 138A. In the case of the passenger screen 124C, the reflected images thereof can only be viewed at the design-intent clarity by a person sitting in a vehicle front passenger seat, i.e., a front seat passenger, with at least one of their eyes disposed in the viewing area 138C. Reduced clarity viewing of the screens 124A and 124B may be possible for a passenger in the vehicle 102 seated in back of the operator when the viewing area 138A expands conically in a rearward direction away from the screens 124A and 124B. Similarly, reduced clarity viewing of the screen 124C may be possible for a passenger in the vehicle 102 seated in back of the front passenger when the viewing area 138C expands conically in a rearward direction away from the screen 124C.

An eye box, mentioned in the previous paragraph, is a zone in free space near or encompassing a person's (e.g., vehicle operator's) head within which the person much align their head, or one or both eyes, to view a projection in a viewing area 138 from a specified projector 124. Thus, if the person's eyes are not properly located, e.g., too far up or down, and/or or too far left or right, a view of a viewing area 138 may be lost.

As further shown in FIG. 3, the holographic film layer 152 may be disposed between a first glass layer 154 and a second glass layer 156. The holographic film layer 152 may be supplemented by a plurality of transparent supplemental film layers 158 disposed between the holographic film layer 152 and the glass layers 154 and 156. Example supplemental film layers 158 may include one or more of any of a polyvinyl butyral film layer, a polyamide film layer, and a polyethylene terephthalate film layer, i.e., a PET film layer. Laminated windshields incorporating the holographic film layer 152 are available from, by way of example, Ceres Holographics, Ltd. of Livingston, Scotland.

Figure 4:
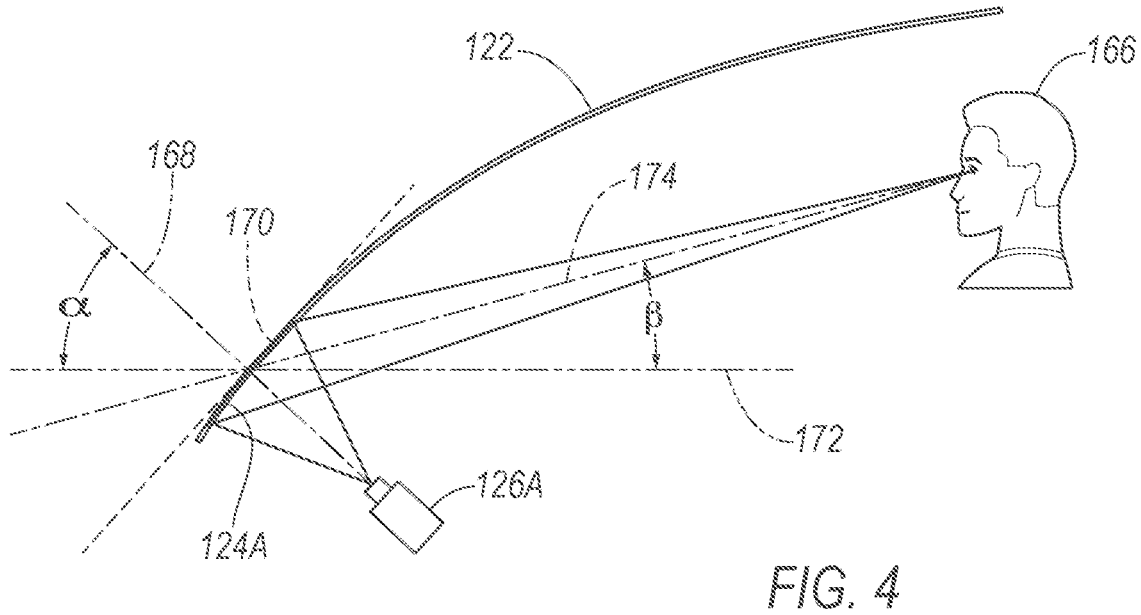
FIG. 4 is a side view of a driver in an example seated position in an example vehicle illustrating both an example image projection angle and an example viewing angle associated with an example projector.

FIG. 4 shows a vehicle operator 166 viewing an image on the driver cluster screen 124A as projected by the driver cluster projector 126A. The driver cluster projector 126A is oriented upward from a location below the driver cluster screen 124A to project along a projection axis 168 that may be substantially normal to a windshield tangential plane 170. The windshield tangential plane 170 is tangent to the windshield 122 and the driver cluster screen 124A at a point where the projection axis 168 intersects the windshield 122. The projection axis 168 is oriented at a projection angle α relative to a horizontal plane 172. An example value of α may be 61 degrees.

The operator views the image on the driver cluster screen 124A along a viewing axis 174 oriented at a viewing angle β relative to the horizontal plane 172. The viewing angle β may be determined by considering factors that may include a location of the operator's eyes relative to the driver cluster screen 124A and the image projected thereon, a distance of the operator's eyes from the driver cluster screen 124A, a vertical distance between the operator's eyes and a center of the driver cluster screen 124A, the optical characteristics of the holographic film layer 152, the slope of the windshield, and the projection angle α. An example value of the angle β may be in a range of six to seven degrees. The operator's eyes must be in the driver eye box for the viewing area 138A to view the projected image on the driver cluster screen 124A. While only the geometry for the driver cluster screen 124A and driver cluster projector 126A are illustrated, the geometries for the other screens 124B, 124C and projectors 126B, 126C may be substantially similar.

HUD Projections, Including Projections External to a Vehicle

When a vehicle computer 120 such as a projector controller 140 receives a communication trigger for a heads-up display (HUD) in a vehicle to project light external to a vehicle 102, the computer 120 can identify a medium to visibly receive the light external to the vehicle 102; and then cause a projector 126 to project the light from the HUD to be visible external to the vehicle 102 in response to the communication trigger. Further, the computer 120 may control or modify in intensity of the light to enhance the visibility of the light based on a characteristic of the medium. For example, referring to FIGS. 5 and 6, light may be projected in a region 175, including a subregion 175B outside the vehicle 102, and may include an image 176 that can be projected onto a surface 180. That is, projected light could simply be provided to be visible outside the vehicle 102 without forming an image, or could be provided to be visible outside the vehicle 102 including an image visible on a medium such as a surface 180, e.g., a logo, arrows, or other identifier or message indicating a presence of and/or other information about the vehicle 102.

A communication trigger in the context of this document means a signal of data received in a vehicle computer 120 according to which the computer 120 is programmed to take an action such as actuating a HUD projector. A communication trigger could, for example, include a request from a user device to locate the vehicle, a request from a second vehicle, and/or a detected object within a specified distance of the vehicle, whereby light projected external to the vehicle from a projector 126 can provide a message or information to a user and/or device external to the vehicle. For example, a user device 104 could provide a communication trigger by a user selecting a button on a key fob or an icon on a touchscreen of a smart phone to locate a vehicle 102. Alternatively or additionally, a second vehicle could provide a communication trigger to a vehicle 102. For example, the second vehicle could receive a communication trigger from a user device, and then could broadcast a message to vehicles in a projection environment 178, including a vehicle 102, to project light external to the vehicle 102 in a projection region 175 including a subregion 175B external to the vehicle 102, possibly including an image 176 (see FIGS. 5, 6). Yet further alternatively or additionally, one or more vehicle sensors 114 and/or computers 120 could provide a communication trigger. For example, sensor data could indicate an object in an environment 178, and a projector controller 140 could be instructed, e.g., by another vehicle computer 120, to project light and/or an image 176 in response to detecting the object. For example, for security purposes, light could be projected upon detecting a user approaching a vehicle 102, e.g., where a computer 120 in the vehicle 102 determines that the user lacks a user device 104 associated with the vehicle.

Further, a computer 120 could actuate the projection of light based on a location of a vehicle 102 and/or characteristics of an environment around the vehicle 102 in addition to actuating the light projection based on the communication trigger. For example, as discussed below, projection of light could be actuated to identify a location of a vehicle 102, e.g., light could be projected in a subregion 175B over a vehicle

102 to indicate the vehicle 102 location, and/or could include an image 126 with indicia of a vehicle 102 location, such as arrows or the like. As further discussed below, projection of light could be actuated based on characteristics of the environment 178, such as the availability of one or more surfaces 180 to receive and reflect a projection of light, an amount of ambient light in the environment 178, and/or the presence of moisture or other particulate in the environment 178 that could reflect light, etc.

Yet further, the computer 120 could actuate the projection of light from multiple projectors 126 in a vehicle 102. For example, respective projectors 126 could be positioned at a left and right side of a vehicle 102 (e.g., projectors 126A and 126C as seen in FIG. 2) or could be at a front and rear of a vehicle 102, respectively, whereupon light emitted from the respective projectors 126 may be visible from different vantage points in an environment 178. Further, light from the respective projectors 126 may project same or different images 176 on different surfaces 180 in the environment 178. In an example, light from respective projectors 126 could be projected to form a pattern, e.g., as discussed below, a projection angle α of a projector 126 could be adjusted while light is projected from the projector 126, and moreover, projection angles α of respective projectors 126 would be adjusted while the projectors 126 respectively project light, to provide a pattern, e.g., a sweeping pattern indicating a direction in which a vehicle is likely to be located and/or to highlight a location of the vehicle. Yet further, if images 176 are provided from the projectors 126, the images could form a pattern, e.g., an arrow pattern or the like.

In an example, one or more projectors 126 could be actuated to project light according to a pattern that encodes a message according to any suitable encoding scheme. For example, encoding could be achieved by a scheme in which a projector 126 is activated and deactivated for various time intervals, light is displayed in various colors, etc. In another example, an image 176 could include a pattern that could be decoded as representing, or used to obtain, information. A Quick Response (QR) code would be an example of such a pattern.

Yet further, light from one or more DLP HUD projectors 126 could be provided in concert with other light from other display light sources, such as light-emitting diode (LED) sources such as headlamps, taillights, etc., on a vehicle 102. For example, a projector 126 could be actuated in response to a communication trigger to provide a sweeping pattern or the like indicating a vehicle 102 location, and in concert with actuation of the projector 126, and also in response to the communication trigger, vehicle 102 headlamps and/or taillights could be actuated to indicate the vehicle 102 location.

Figure 5:
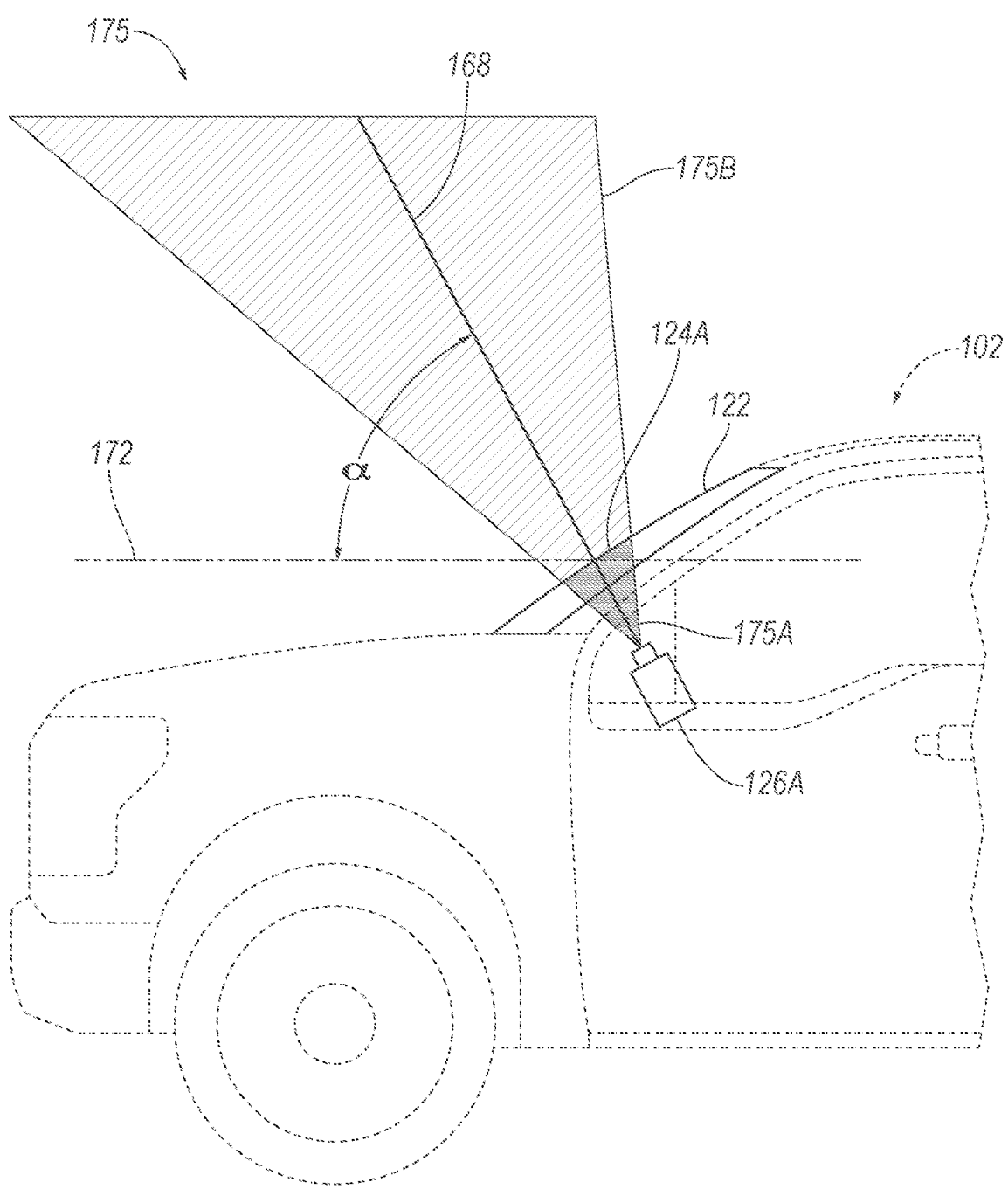
FIG. 5 is a side view of an example vehicle with an example projector illustrating an example image projection angle.

FIG. 5 illustrates a projection of light from the driver cluster projector 126A along the projection axis 168 beyond the driver cluster screen 124A. The driver cluster projector 126A and the driver cluster screen 124A are shown in a vehicle setting with more context than in FIG. 4. The various elements are as set forth above in the description of FIG. 4. Further, FIG. 5 illustrates a projection region 175 of the projector 126A. The projection region 175 is a region or space that may be generally conical and occupied by light emitted or projected from the projector 126A. As seen in FIG. 5, the projection region 175 may have subregions 175A, 175B, the subregions being bounded by the windshield 122, which has one or more screens such as the screen 124A formed or disposed thereon.

A projection intensity of light emitted from a projector 126 may be at a first intensity in the subregion 175A, i.e., a subregion between the projector 126A and the screen 124A. The projection intensity of light from the projector 126 may then be at a second, lesser, intensity in the subregion 175B, after the light has passed through the screen 124A. As mentioned above, a computer 120 can identify a medium external to a vehicle 102 that may visibly receive light (i.e., receive light that will be detected in a portion of the visible spectrum). In one example, the computer 120 could identify a surface 180 from data from one or more vehicle sensors 114. Any suitable data and/or technique could be used, e.g., camera data, radar data, lidar data, etc., could be used to identify a surface 180. In another example, in addition, or as an alternative, to identifying a surface 180, the computer 120 could identify a medium in an environment 178 around a vehicle that could detect light. For example, precipitation, mist, or other moisture or particulate matter could be identified, e.g., from image sensor 114 data. The computer 120 could then determine that the environment 178 included a medium for reflecting visible light. In the present context, an environment 178 around a vehicle, or an environment 178 proximate to a vehicle, means a space around the vehicle within range of vehicle sensors 114 and/or a space around the vehicle in which light can be projected.

Various suitable techniques could be used for detecting a medium for reflecting visible light. In one example, a vehicle 102 may be equipped with one or more forward looking camera sensors 114, e.g., to support a lane departure and/or lane keeping system. Image data from such sensors 114 could be analyzed using suitable image recognition techniques to detect one or more media for reflecting light, such as rain, mist, fog, snow, and/or dust, etc. In one example, vehicle 102 headlamps could be activated to then capture one or more images from forward cameras to assess characteristics of the light beam, i.e., determine whether the light from vehicle 102 headlamps is reflected by some medium. Alternatively, or additionally, the vehicle 102 could be equipped with sensors 114 to support an automatic windshield wiper system by detecting precipitation, e.g., a level of rain and/or snow; data provided on a vehicle CAN bus or the like to support an automatic windshield wiper system could also be used to determine a presence of a medium for reflecting visible light projected from a projector 134. Yet further alternatively or additionally, weather data could be downloaded from the cloud server 106, e.g., indicating a presence of fog, mist, precipitation, etc.

Figure 6:
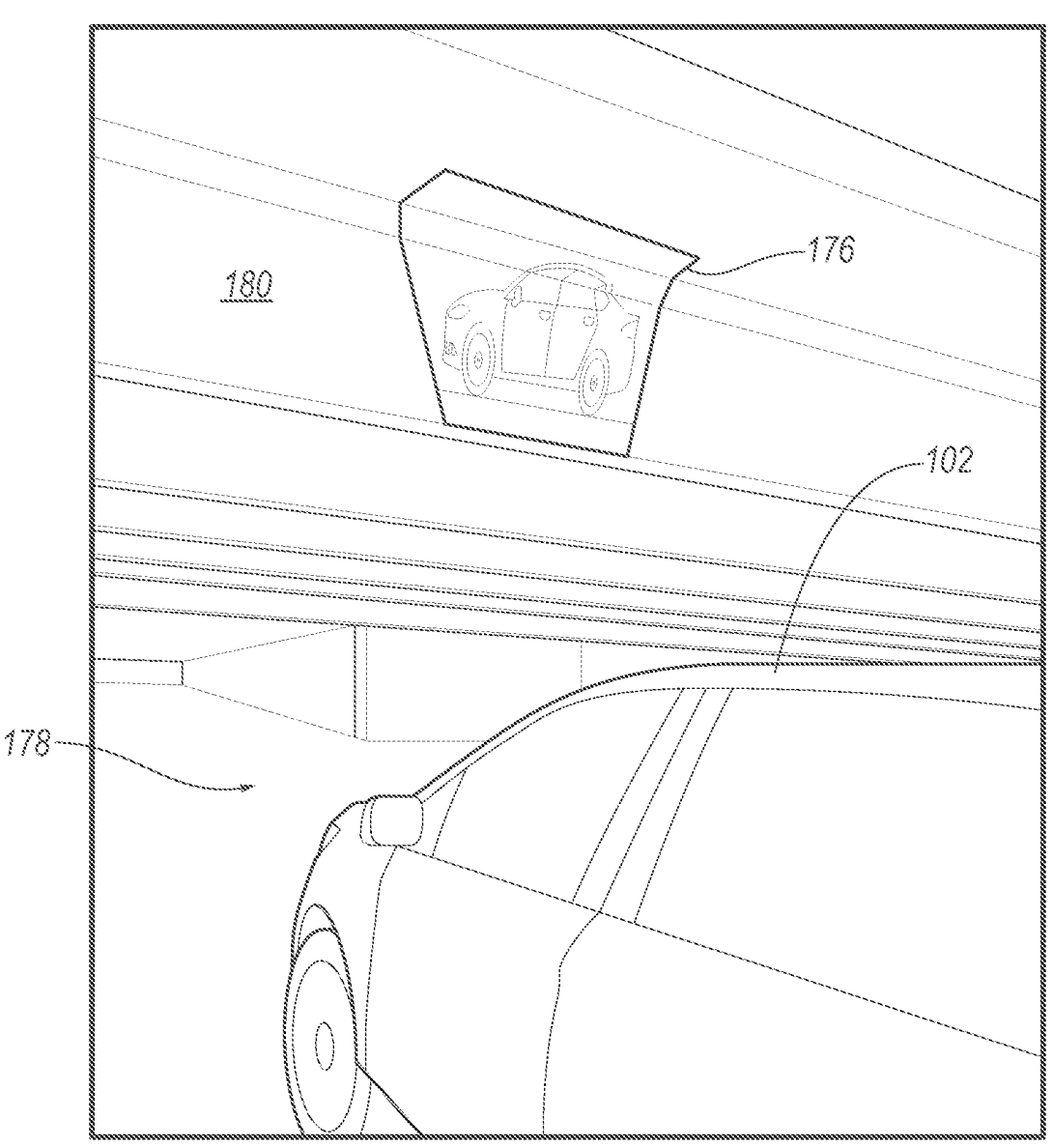
FIG. 6 illustrates an example incidental projection of the example projection system of FIG. 1 and FIG. 2.

FIG. 6 shows an example of a projection image 176 that may be provided by one of the TD HUD projectors 126A, 126B, and 126C (not visible in FIG. 6) of the vehicle 102 in a projection environment 178 (i.e., a space occupied in part by a vehicle 102 and into which one or more projectors 126 in the vehicle 102 may project light). The HUD screens 124A, 124B, and 124C may reflect only a portion of the light projected thereonto as an image viewable by, depending on the screen location, the vehicle operator or the front seat passenger. Much of the light not reflected, an example portion being 60 percent, can pass through the screens 124A, 124B, and 124C. That is, as just described with respect to FIG. 5, light not reflected by a screen 124 may pass through the screen 124 and from a subregion 175A to a subregion 175B of a projection region 175A, the light in the subregion 175B having a lower intensity than in the subregion 175A. A projector emitting 400 lumens of light may for example yield a projection intensity of 240 lumens of light. The light passing through the screen 124A, 124B, 124C, or any one thereof, when it strikes a surface 180 in a path of projection of the of the image beyond the windshield, may result in projected light, which in some examples can form a projection image 176, that can be seen outside of the vehicle.

Some environments more than others, such as dark areas that are shaded, interior, etc., where ambient light is diminished from an intensity of ambient light in typical daylight conditions and/or environments with precipitation or mist that may reflect light, are susceptible to light and/or a projection image being seen outside of a vehicle 102. That is, light, possibly including an image, may be seen after it has been projected onto and then at least partially passed through a screen 124A, 124B, 124C. Examples of projection environments 178 in which light may be visible outside of a vehicle 102 include parking garages, as illustrated in FIG. 6, road tunnels which may present surfaces that serve as secondary screens for the projection image 176 to form on, and an outdoor area where precipitation and/or mist is present.

As mentioned above, a computer 120 can identify a medium for reflecting light such as moisture or other particulate, or a surface 180. Further, the computer 120 can determine an intensity of light to be projected in a subregion 175B based on one or more characteristics of the identified medium, and may modify or control an intensity of light to enhance the visibility of the light based on the one or more characteristics of the identified light medium. A characteristic of a light medium means a quantity or quality of the medium, and is typically a quantity or quality that may affect reflection of visible light. For example, such a characteristic of a light medium could be a reflectance value, an intensity of ambient light in an environment 178, and/or a type of medium, e.g., a surface 180, precipitation, mist, etc.

One or more characteristics of respective light media could be stored in the computer 120 and associated with a set of light output or projection parameters, including respective intensities for projecting light and/or images in the media when present in a subregion 175B. In the context of this document a set of light output, i.e., projection, parameters is one or more values governing output of light from a projector 126. For example, projection parameters can be specified for characteristics of light media outside a vehicle (e.g., whether a projection surface is available) as well as a type of the light output. Typically, light output from a projector 126 outside a vehicle 102 could be one of various possible types of light output. In the context of this document, a type of light output means a purpose or content of the light output, i.e., communicate certain information, such as to show a vehicle location, to provide a security alert, or to illuminate an environment 178, etc. Accordingly, projection parameters could include information to be communicated (e.g., a location of a vehicle, a security alert, etc.), and intensity and/or color of light to be output, and/or an image to be retrieved from a memory of a computer 120 and projected.

A type of light output, i.e., information to be provided via light output, could be determined by data in a communication trigger, from a communication from another vehicle, based on an available projection medium and/or surface 180, and/or from data obtained from vehicle sensors 114. For example, if a communication trigger is received from a user device 104, e.g., input to a "locate" button or icon, a light output type could be a "show location" type. In another example, if an unrecognized pedestrian is detected in an environment around a vehicle 102, e.g., within a predetermined distance such as 2 meters, a light output type could be a "security alert" type. In another example, where the communication trigger may be received from another vehicle to aid in location for that other vehicle, for example, a projection type might be a "cooperative output" type, i.e., the projection type specifies that output is being provided to cooperate with a request from another vehicle. Typically a cooperative output type is combined with another type, e.g., a "show location" type to show a location of an ego vehicle 102.

As just described, two or more projection parameters could be established that are correlated to levels of light available in the environment. Alternatively or additionally, in one approach, a computer 120 could be programmed to utilize one or more predefined projection parameters. For example, in this approach, a specified intensity for output from a projector 126 could be a maximum intensity setting, independent of a detected medium and/or intensity of ambient light. In this approach, a time of activation of a projector 126 could be varied or controlled based on one or more suitable factors, such as an amount of time a projector 126 could be at a maximum or high setting without overheating a DLP unit. For example, the time could be dependent on a temperature of a DLP unit in a projector 126 reported by a sensor 114. Based on manufacturer specifications and/or empirical testing, a computer 120 could store one or more temperature thresholds associated with respective times, i.e., amounts of time, that a projector 126 could be activated at a specified, e.g., maximum, setting.

Yet further alternatively or additionally, a projection parameter (typically light intensity in this example) could be varied based on SOC (State of Charge) of a vehicle 102 battery or batteries, such as a low voltage battery and/or a high-voltage (e.g., traction) battery. For example, a light intensity could be reduced when the SOC of one or more batteries fell below a threshold level or respective threshold levels. Yet further alternatively or additionally, where the SOC of one or more of the batteries fell below a threshold level or respective threshold levels, a projection parameter could specify a maximum or high light intensity, and another projection parameter could specify a blinking or other timed activation pattern to reduce energy usage. Further, to alleviate possible overheating and/or excessive energy usage, a projection parameter could specify a "time out" value, i.e., an amount of time after which activation of a projector 126 should be ended.

Figure 7:
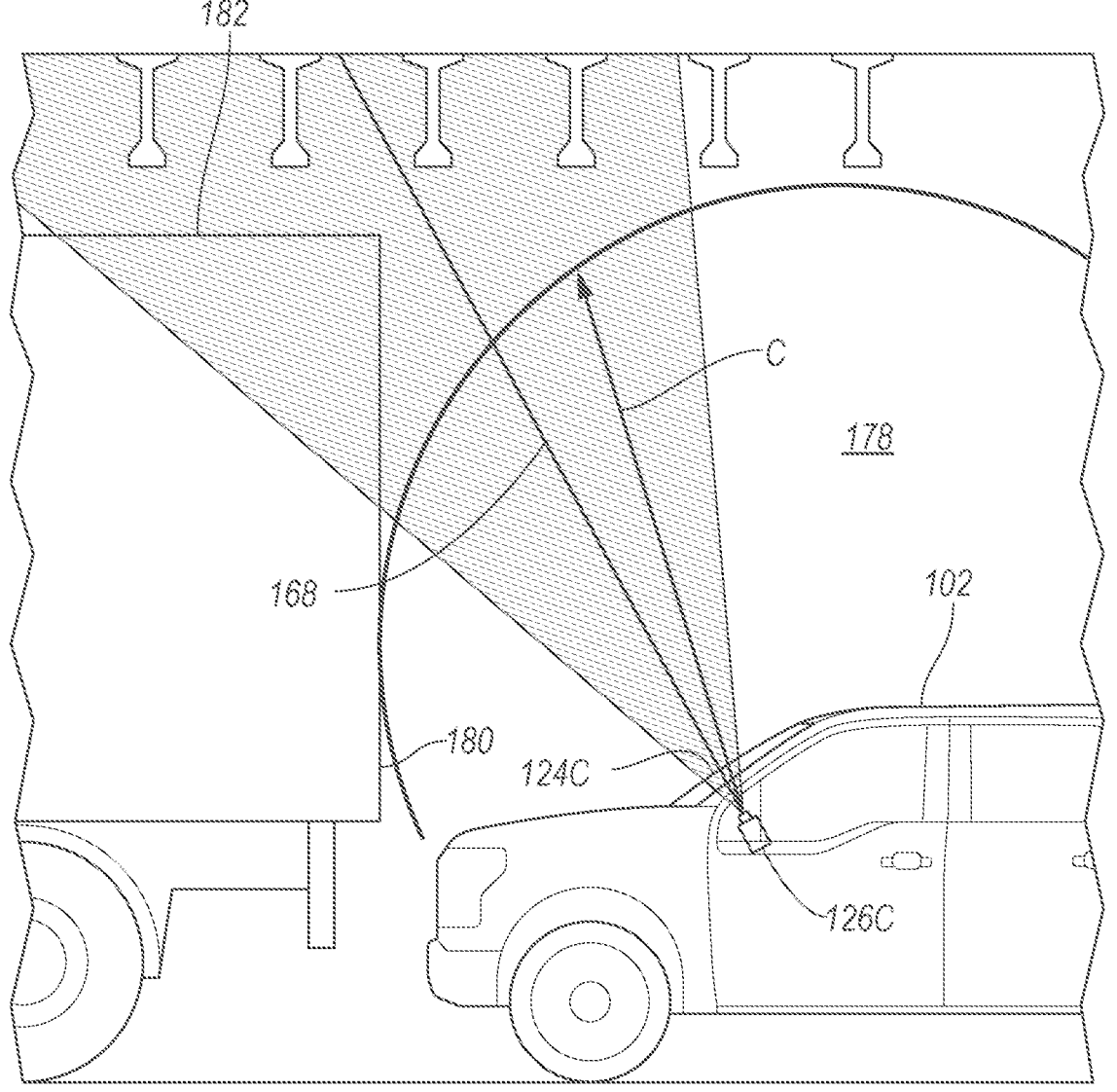
FIG. 7 illustrates an example positioning of an example vehicle that may result in a projection of the example projection system of FIG. 1 and FIG. 2.

As shown in FIG. 7, besides a building structure as illustrated in FIG. 6, objects, e.g., vehicles such as a large truck 182 or a trailer 182 having a large rear surface 180, may provide such secondary screens for projection images 176. The projectors 126A, 126B, 126C may have a limited depth of field focal point. Additionally, the brightness of the projection image 176 will decrease proportionately to a square of the distance of the surface 180 from the projector 126A, 126B, 126C. Accordingly, a computer 120 may be programmed to adjust an intensity and/or colors of an image 176 so that the image may be read or discerned more clearly on a surface at a specified distance, e.g., a distance C as illustrated in FIG. 7.

Referring back to FIG. 4, a projection angle α could be specified or adjusted to project light outside of a vehicle 102. As mentioned above, typically a projection angle α is specified to project light including one or more images on one or more screens 124, e.g., on a vehicle window 122. However, the projection angle α may be differently specified or adjusted for light intended to be projected in a subregion 175B outside of the vehicle 102. For example, the projection angle α could be adjusted based on a detected target surface 180, e.g., as seen in FIG. 7, the projection angle α is such that light is projected toward a ceiling in an environment 178, and partially intersects a trailer 182. Accordingly, in this example, the projection angle α could be adjusted downward to better accommodate reflection of light and/or display of an image 126 on a rear surface 180 of the trailer 182. Alternatively, the projection angle α could be adjusted upward so that light from a projector 124 had no or less intersection with the trailer 182 and was projected on the ceiling of the environment 178. In yet another example, projection angle α could be adjusted as light was projected, i.e., the angle could be adjusted at multiple times including even continuously while the light is projected, e.g., to display a moving arrow or the like on a ceiling of an environment 178, thereby highlighting for a user a direction in which a vehicle 102 may be located. Further, direction or suggested movement could be conveyed by sequential activation of projectors 126A, 126B, 126C each displaying an arrow in a sequential pattern pointing toward the passenger side of the vehicle or the reverse, where each projector 126 would be activated with an arrow image in an activation pattern, e.g., starting with 126C, then 126B, and then 126A, thereby forming a sequential pattern to point toward a driver or operator side of the vehicle 102.

A projection angle α could be adjusted based on an identified medium. This could encompass adjusting the projection angle α based on a type of the medium, e.g., a surface 180, as well as a location of the medium. As illustrated, the projection angle α is in a vertical plane. It should be understood that the projection angle α could be in a horizontal plane, and/or that a second projection angle could be provided in a horizontal plane in addition to the projection angle α in the vertical plane. A horizontal projection angle α and/or a second horizontal projection angle in combination with the vertical projection angle α could be adjusted as described based on an identified medium.

Figure 8:
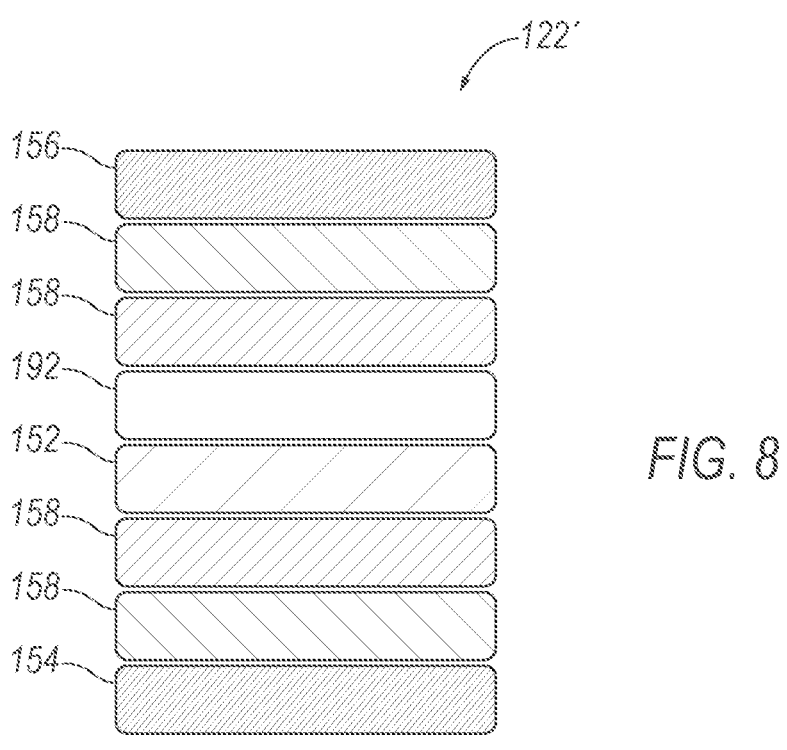
FIG. 8 is a schematic illustration of second example layers of a laminated windshield.

FIG. 8 illustrates an alternatively layered windshield 122'. The layers that may be employed in the windshield 122 of FIG. 3 may also be found in the windshield 122' of FIG. 9. One additional layer 192 has been added to the windshield 122', distinguishing it from the windshield 122. The additional layer 192 comprises an electronically tintable layer 192. The electronically tintable layer 192 may be used to selectively render a portion of the windshield 122' in which the layer 192 is disposed substantially opaque. The electronically tintable layer 192 may be placed on a far side of the holographic film layer 152 relative to the location of the associated one of the TD HUD projectors 126A, 126B, and 126C. Tintable portions of the tintable layer 192 may be sized to be substantially the same size as the HOEs defining the screens 124A, 124B, 124C and substantially aligned therewith. To ensure blocking of all of the image being projected, the tintable portions of the tintable layer 192 aligned to be associated with each of the screens 124A, 124B, 124C are located and sized to at least cover the portion of the windshield that the projection of the image from the associated TD HUD projector 126A, 126B, 126C impinges on. Accordingly, the tintable layer 192 is illustrated as disposed between the holographic film layer 152 and the second glass layer 156. The second glass layer 156 may be an exterior glass layer 156. Electronically tintable layers 192 are available from various suppliers as is known. U.S. Patent Publication No. 2022/0283458A1 describes an alternative tintable layer with localized tinting, for example. Actuation of the tintable layer 192 to adjust it to a substantially opaque condition may be employed to control intensity of a transmission of light from the TD HUD projector such as TD HUD projectors 126A, 126B, 126C, through and beyond the windshield 122'.

Example Processes

Figure 9:
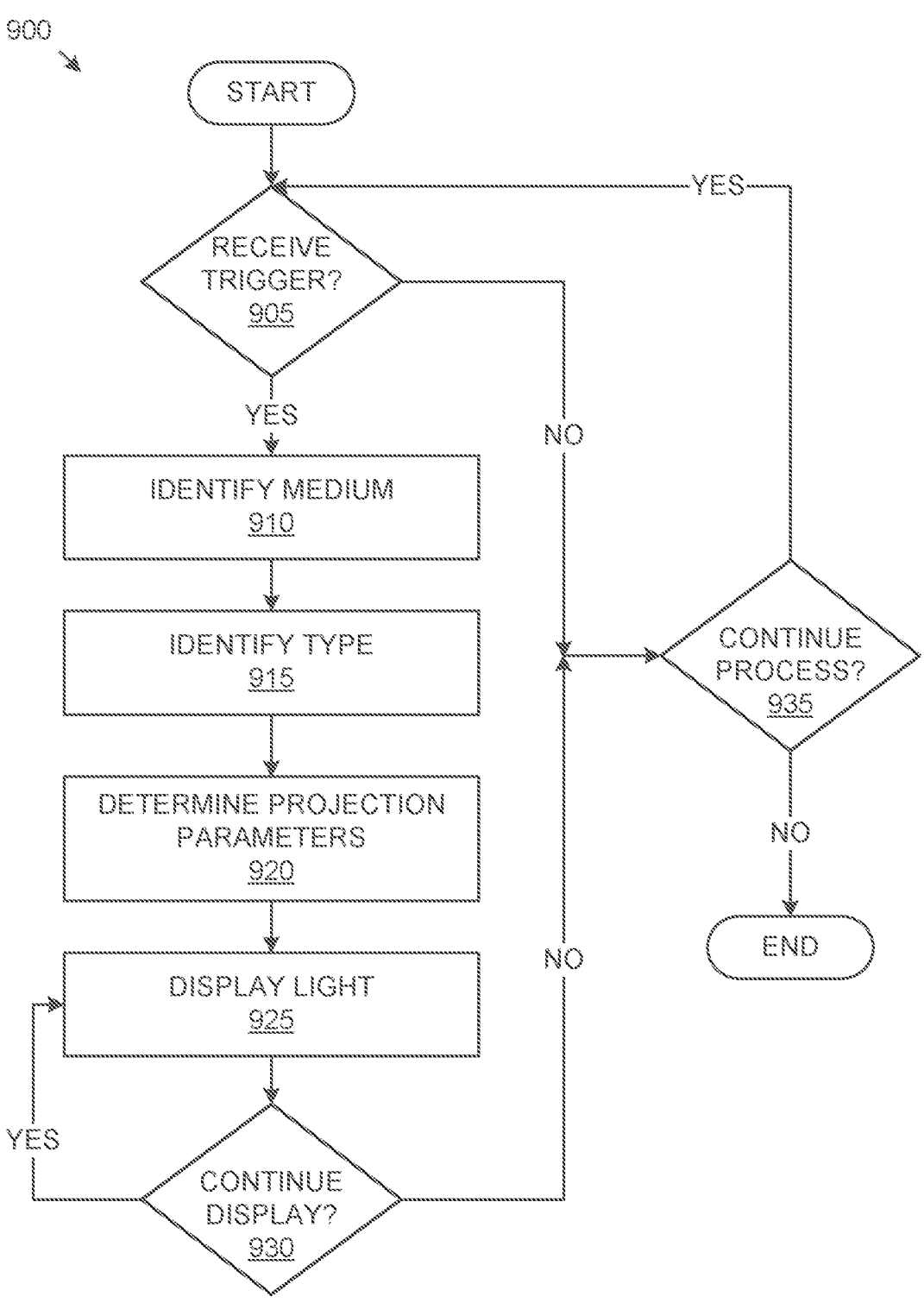
FIG. 9 is a flowchart of an example process for displaying light from a HUD projector outside of a vehicle.

FIG. 9 is a flowchart of an example process 900 for displaying light from a HUD projector outside of a vehicle. The process 900 may be carried out according to program instructions stored in and executed by one or more vehicle computers 120, including a projector controller 140. Typically a condition for the process 900 to start is that a vehicle 102 propulsion component 110 is in a stationary or parked state, e.g., deactivated. In some implementations, the process 900 may start when the vehicle is in a parked state and vehicle 102 propulsion is activated such as when the vehicle has been remote started. Alternatively, the process 900 could be started when a computer 120 receives user input to initiate the process 900.

Upon starting, the process 900 enters a decision block 905, in which a determination is made whether a communication trigger has been received. For example, as described above, a communication trigger could be a signal from a user device 104, detection of a moving object such as an unidentified pedestrian in a field of view of sensors 114 of the vehicle 102, etc. If a communication trigger is received, then the process 900 can proceed to a block 910. Otherwise, the process 900 can proceed to a block 935.

In the block 910, a medium for projection of light outside of or external to the vehicle 102 is identified. For example, the medium could be a surface 180, atmospheric matters such as mist or other particulate matter, etc.

Following the block 910, in a block 915, a projection type, also referred to as a type of light output, can be determined.

Following the block 915, in a block 920, projection parameters can be determined. As explained above, a projection parameter is a data value that can be used to control a projector 126. A projection type is one example of a projection parameter. Other example projection parameters include a light intensity, a light color, a distance of a surface 180 on which an image 176 is to be projected, etc. A light intensity and/or light color can be determined based on an identified medium external to the vehicle 102 and/or a characteristic of an environment 178 around the vehicle 102, such as an amount of ambient light (e.g., measured in lumens). Further, a projection type can be used to determine other projection parameters, e.g., a projection parameter could specify whether an image is to be projected (e.g., a binary yes/no value). Yet further, if an image is to be projected, a projection parameter could specify the image to be projected, typically based on the projection type and other data, such as a location of a user device relative to a vehicle 102 which could be used to determine that an arrow image should be selected, a message to be displayed based on a determination of security alert projection type, etc.

Following the block 920, in a block 925, one or more projectors 126 in a vehicle 102 are actuated to display light according to the projection parameters determined in the block 915.

In a block 930, a determination is made whether to continue the display actuated in the block 925. For example, user input to a user device 104 could be received to stop the display, a vehicle propulsion could be actuated, or some other signal could be received in a computer 122 to provide basis for stopping the display, e.g., a door of a vehicle 102 being opened. If the display is to continue, then the process 900 returns to the block 925 to continue the display. Otherwise, the process 900 proceeds to the block 935.

In the block 935, a determination is made whether to continue the process 900. For example, user input via a vehicle human machine interface and/or a user device 104 could deactivate the process 900, or a vehicle propulsion could be activated, or a time-out occurs, etc. If the process 900 is not to continue, then the process 900 can and following the block 930. Otherwise, the process 900 can return to the block 905.

Figure 10:
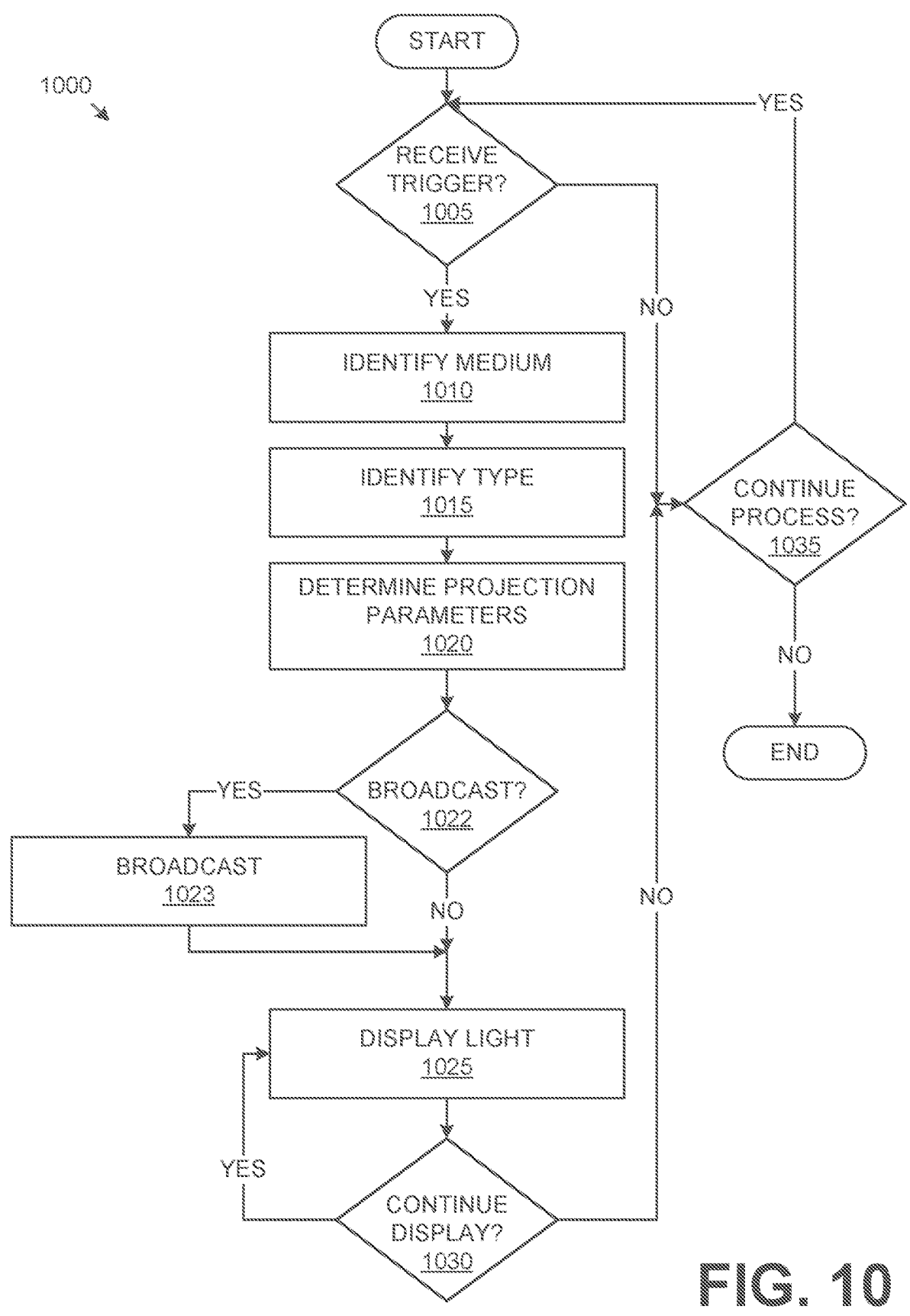
FIG. 10 is a flowchart of an example process for multiple vehicles cooperating to display light from respective vehicle HUD projectors outside of the respective vehicles.

FIG. 10 is a flowchart of an example process 1000 for multiple vehicles cooperating to display light from respective vehicle HUD projectors outside of the respective vehicles. The process 1000 can be started under conditions such as those described above with respect to the process 900.

The process 1000 can start in a decision block 1005. The blocks 1005-1020 are substantially the same as the blocks 905-920 described above.

In a block 1022, which can follow the block 1020, a determination is made whether to broadcast a message to other vehicles from an ego vehicle 102, requesting cooperative light displays from the other vehicles. For example, input from a user device 104 could specify to request cooperative displays from other vehicles. Alternatively or additionally, a determination whether to broadcast a message to other vehicles could be based on a location of an ego vehicle 102. For example, a vehicle could be in a parking area with noise or light restrictions. Yet further alternatively or additionally, a determination whether to broadcast a message to other vehicles could be based on a time of day, e.g., certain hours could be associated with light and/or noise restrictions, e.g., between 10 PM and 6 AM. If a determination is made to broadcast a message requesting cooperation, then the process 1000 proceeds to a block 1023. Otherwise, the process 1000 proceeds to a block 1025.

In the block 1023, a message is broadcast from the ego vehicle 102 to be received by other vehicles in an environment 178 of the vehicle 102. For example, the message could be sent from a communication interface 116 via a protocol, such as a V2X protocol, as described above.

The block 1025, which may follow either of the blocks 1022, 1023, is substantially the same as the block 925 described above. The block 1030 is substantially the same as the block 930 and the block 1035 is substantially the same as the block 935.

Further Information

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computing device that includes a processor and a memory, wherein the memory stores instructions executable by the processor such that the computing device is configured to:

receive a communication trigger for a heads-up display (HUD) in a vehicle to project light external to a vehicle;

identify a projection parameter to visibly project the light external to the vehicle; and project the light from the HUD to be visible external to the vehicle in response to the communication trigger and according to a pattern that encodes a message, wherein the pattern specifies a timing of projecting the light.

2. The system of claim 1, wherein the projection parameter is based on a detected medium external to the vehicle.

3. The system of claim 2, wherein the detected medium includes at least one of a surface of an object or moisture in an environment proximate to the vehicle.

4. The system of claim 2, wherein the instructions further include instructions to modify an intensity of the light to enhance visibility of the light based on a characteristic of the detected medium.

5. The system of claim 1, wherein the instructions further include instructions to project the light to form an image.

6. The system of claim 5, wherein the image includes at least one of an indicia of a location of the vehicle or an identity of the vehicle.

7. The system of claim 1, wherein the instructions further include instructions to project the light to adjust an angle of projection of the light.

8. The system of claim 7, wherein the instructions to adjust the angle of projection of the light include instructions to determine the angle of projection based on a detected medium external to the vehicle.

9. The system of claim 7, wherein the instructions to adjust the angle of projection of the light include instructions to adjust the angle of projection at multiple times while projecting the light.

10. The system of claim 1, wherein the instructions further include instructions to project the light, in addition to in response to the communication trigger, based on one or both of a location of the vehicle and an environment around the vehicle.

11. The system of claim 1, wherein the communication trigger includes a request from a user device to locate the vehicle, a request from a second vehicle, or a detected object within a specified distance of the vehicle.

12. The system of claim 1, wherein the instructions further include instructions to project second light from a second heads-up display (HUD) in response to the communication trigger.

13. The system of claim 12, wherein the instructions further include instructions to project the second light to form a second image.

14. The system of claim 12, wherein the instructions further include instructions to project the second light from the second HUD to form a pattern with the light projected from the HUD.

15. The system of claim 1, wherein the instructions further include instructions to project the light in concert with other light projected from one or more non-heads-up display light sources.

16. The system of claim 1, wherein the instructions further include instructions to project the light according to a pattern that encodes a message, wherein the pattern further specifies one of a color and/or a shape.

17. The system of claim 1, wherein the timing is based on a temperature.

18. The system of claim 1, wherein the projection parameter is based on energy usage.

19. A method, comprising:

receiving a communication trigger for a heads-up display (HUD) in a vehicle to project light external to a vehicle;

identifying a projection parameter to visibly project the light external to the vehicle; and projecting the light from the HUD to be visible external to the vehicle in response to the communication trigger and according to a pattern that encodes a message, wherein the pattern specifies a timing of projecting the light.

20. A system, comprising a computing device that includes a processor and a memory, wherein the memory stores instructions executable by the processor such that the computing device is configured to:

receive a communication trigger for a heads-up display (HUD) in a vehicle to project light external to a vehicle;

identify a projection parameter to visibly project the light external to the vehicle, wherein the projection parameter is based on energy usage; and project the light from the HUD to be visible external to the vehicle in response to the communication trigger.

21. The system of claim 1, wherein the instructions further include instructions to project the light according to a pattern that encodes a message, wherein the pattern specifies one or more of a color, a shape, and a timing of projecting the light.

* * * * *